May 17, 1927.
J. F. CREGAN
1,628,953
PROCESS OF MAKING ZINC OXIDE
Filed Oct. 25, 1924
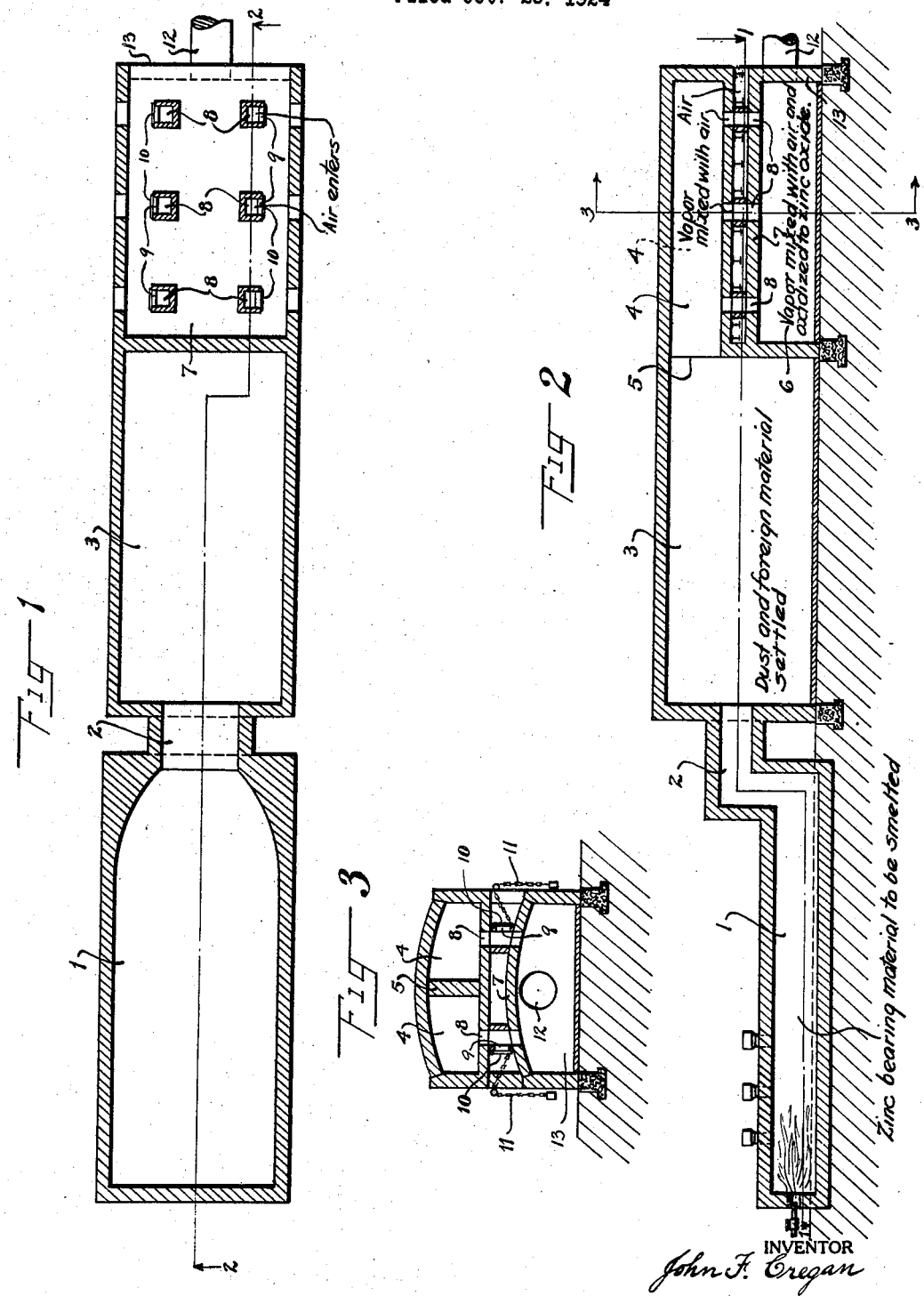
INVENTOR
John F. Cregan
BY
Albert M. Austin
ATTORNEY Patented May 17, 1927.

1,628,953

UNITED STATES PATENT OFFICE.

JOHN F. CREGAN, OF PUEBLO, COLORADO, ASSIGNOR TO AMERICAN SMELTING AND REFINING COMPANY, OF NEW YORK, N. Y., A CORPORATION OF NEW JERSEY.

PROCESS OF MAKING ZINC OXIDE.

Application filed October 25, 1924. Serial No. 745,794.

My present invention relates to a method of treating zinc fumes for the production of zinc oxide and to apparatus by means of which such process is practiced and especially to a method and apparatus for producing zinc oxide from such vaporized zinc in one continuous but simple and economical operation.

The invention relates particularly to a method and process whereby zinc is distilled from zinc bearing material and impurities are removed from the zinc fumes and a certain degree of oxidation attained after which air is mixed with the fumes so as to form a thorough and intimate mixture with consequent further oxidation of the zinc fumes by the oxygen of the air admixed therewith.

The invention further consists in the new and novel features of operation and the new and original arrangements and combinations of steps in the process hereinafter described and more particularly set forth in the claims.

According to my invention, zinc vapor from a suitable source such as a reverberatory furnace, is vaporized and passed through a settling chamber in which impurities will be settled out. From the settling chamber the fumes pass through main flues in close proximity to an oxidizing chamber. Short connecting flues having air inlets connect the said main flues with said oxidizing chamber. Through the coming together of the zinc fumes and the air at a plurality of points and then passing therefrom immediately into the oxidizing chamber there is secured a rapid, efficient and complete mixture of the zinc fumes and the air, resulting in complete and uniform oxidation of the fume.

The oxide may be collected by suitable means such as are well known in the art.

In the drawings:

Fig. 1 is a plan view in section taken along line 1—1 of Fig. 2 looking in the direction of the arrows, and shows a reverberatory furnace, a settling chamber, flues leading from the upper part of said chamber, and an oxidizing chamber positioned below said flues and communicating therewith through mixing flues having air inlet openings.

Fig. 2 is an elevation view in section of the apparatus of Fig 1 taken along line 2—2 of Fig. 1 and Fig. 3 is a sectional elevation view taken along line 3—3 of Fig. 1 and looking in the direction of the arrows.

In an embodiment of my invention illustrated in the accompanying drawings there is diagrammatically shown a reverberatory furnace 1, suitable for smelting zinc carrying material and vaporizing the zinc, although any form of apparatus for producing zinc vapor may be employed. Through a short flue 2, the reverberatory furnace opens into a settling chamber 3 which is sufficiently large to relieve the furnace of any back pressure from the fumes and preferably is approximately twice the volume of the furnace. From the upper part of the settling chamber extend two large or main flues 4—4 which may be separated from each other by a unitary wall 5.

Adjacent to and preferably having its walls continuations of the walls of the settling chamber is a burning and oxidizing chamber 6. The roof 7 of said refining chamber 6 is spaced a comparatively short distance from the floor of the main flues 4—4; connecting the flues 4—4 with the chamber 6 are a plurality of relatively small passages or mixing flues 8—8 which extend between the wall of main flues 4—4 and the roof 7. The openings 9—9 in mixing flues 8—8 admit air into the flue for the purpose of mixing it thoroughly and intimately with the zinc fumes passing from flues 4—4 to chamber 6. The amount of air admitted through openings 9 is regulated by means of the hinged closures 10—10 whose position may be adjusted by means of the chains 11—11 which connect to said doors 10—10. Said chamber 6 exhausts into the flue 12 passing outwardly from the wall 13.

In the use and operation of my invention a charge of zinc ore or other zinc bearing material is fed to the furnace 1 and the zinc vaporized. The zinc fumes pass from the furnace 1 through the flue 2 into the settling chamber 3 where foreign and solid material will settle out as a result of a decrease in rate of travel through said chamber which is of greater volume than said furnace. In the furnace 1 and in the chamber 3 the zinc will be oxidized to some extent (unless of course the zinc is vaporized in a reducing atmosphere). The zinc fumes, now containing zinc oxide as well as metallic vapor, pass from the settling chamber freed of foreign material through flues 4—4, flues 8—8 and into the chamber 6. As the fumes pass through flues 8—8 they are admixed with the air admitted through ports 9—9 and complete oxidation is effected in the chamber 6.

The settling chamber is maintained at a relatively high temperature but below the temperature of the furnace for example approximately at or about 2000° F., control of the temperature being secured by making the walls and roof of the settling chamber of proper materials and thicknesses, by varying the heat insulation thereon, and also by controlling the temperature of the gases entering said chamber 3.

The air readily reacts with the fumes so that a vigorous combustion of the fumes takes place in the oxidizing chamber. This intimate mixture of the fumes and air as obtained by the use of a plurality of mixing flues results in a rapid and economical production of a high grade zinc oxide.

Although I have shown and described and have pointed out in the annexed claims, certain novel features of my invention, it will be understood that various omissions, substitutions and changes in the several steps of my process and in its operation may be made by those skilled in the art without departing from the spirit of the invention.

Having thus described my invention, I claim:

1. The process of producing zinc oxide directly from zinc bearing material, which comprises smelting the material, passing the distilled zinc vapor to a settling chamber to settle out foreign material, removing said vapor and mixing air therewith, then conducting said mixture into a burning chamber and permitting combustion therein to convert the zinc vapor into oxide.

2. The process of producing zinc oxide directly from zinc bearing material, which comprises smelting the material, passing the distilled zinc vapor to a settling chamber maintained at a relatively high temperature to settle out foreign matter, removing the zinc vapor through mixing flues, admitting air into said flues and causing an intimate mixture of the air and the vapor, then conducting said mixture into a burning chamber maintained at a temperature to support rapid oxidation to convert the zinc vapor into oxide.

3. The process of producing zinc oxide directly from zinc bearing material, which comprises smelting the material, passing the distilled zinc vapor into a settling chamber, continuously removing the zinc vapor through mixing flues, admitting air into said flues in volume sufficient to convert all of the vapor into oxide, and then conducting said mixture into a burning chamber.

4. The process of producing zinc oxide comprising smelting zinc bearing material to distill zinc therefrom as a fume or vapor, passing said vapor in a plurality of relatively small streams into a separate chamber, commingling air with said streams in volume sufficient to oxidize all of the zinc, mixing the air intimately with the vapor before entering said chamber and causing oxidation of the zinc vapor in said chamber, and then collecting the zinc oxide.

5. The process of producing zinc oxide directly from zinc bearing material comprising smelting said material to distill zinc therefrom as a fume or vapor, dividing said vapor into a plurality of relatively small streams and passing the same into a separate chamber, commingling air with said streams in volume sufficient to oxidize all of the zinc before entering said chamber, causing oxidation of the zinc vapor in said chamber, and then collecting the zinc oxide.

6. The process of producing zinc oxide directly from zinc bearing material comprising smelting said material to distill zinc therefrom as a fume or vapor, dividing said vapor into a plurality of streams, subdividing said streams into a plurality of smaller streams and passing the same into a separate chamber, commingling air with said smaller streams in volume sufficient to oxidize all of the zinc before entering said chamber, causing oxidation of the zinc vapor in said chamber, and then collecting the zinc oxide.

7. The process of making zinc oxide, comprising dividing a body of zinc vapor into a plurality of small streams, commingling air with said streams in volume sufficient to oxidize all of the zinc vapor, passing said mixture into a common burning chamber to oxidize the zinc, and then collecting the zinc oxide.

8. The process of making zinc oxide, which comprises dividing a body of zinc vapor at a relatively high temperature into a plurality of relatively small streams, commingling air with said streams in volume sufficient to oxidize all of the zinc vapor and passing said mixture into a burning chamber to oxidize the zinc.

9. The process of making zinc oxide, which comprises dividing a body of zinc vapor at a relatively high temperature into a plurality of relatively small streams, mixing air with said streams while the vapor is flowing through a restricted space in volume sufficient to oxidize all of the zinc vapor and passing said mixture into a burning chamber to oxidize the zinc.

10. The process of making zinc oxide, which consists in passing zinc vapor in relatively small quantities through a restricted passage, admitting air to said passage while the vapor is flowing therethrough and causing the air to mix intimately with the vapor and then conducting said mixture into a chamber at a temperature sufficient to support violent combustion.

11. The process of making zinc oxide, which consists in passing zinc vapor in relatively small quantities through a restricted passage, admitting air to said passage while the vapor is flowing therethrough and causing the air to mix intimately with the vapor, conducting said mixture into a separate chamber to oxidize the zinc therein and then collecting the oxide.

12. The process of making oxide, which consists in passing zinc vapor in a continuous stream through flues having a limited cross sectional area to promote rapid flow of the gas therethrough, causing the air to commingle with the vapor in said flue, and burning the mixture in a chamber communicating with said flue.

13. The process of making zinc oxide, which consists in passing zinc vapor in relatively small quantities through a plurality of mixing flues, admitting air to each of said flues while the vapor is flowing therethrough, causing an intimate mixture of the vapor and air in said flues, and supplying said mixture from said flues to a burning chamber at a temperature sufficient to support violent combustion.

14. The process of making zinc oxide, which consists in passing zinc vapor in relatively small quantities through a plurality of mixing flues, admitting a regulated quantity of air to each of said flues while the vapor is flowing therethrough in volume sufficient to oxidize zinc, causing an intimate mixture of the vapor and air in said flues, and supplying said mixture from said flues to a common burning chamber at a temperature sufficient to support violent combustion.

15. The process of treating zinc bearing ore to produce zinc oxide in a continuous operation directly therefrom which comprises smelting the ore in a reverberatory furnace under normal smelting conditions, passing the zinc vapor to a settling chamber maintained at a high temperature below the temperature of the furnace and having a volume greater than the furnace to settle out foreign matter mingled with said vapor and continuously removing portions of the zinc vapor from said settling chamber, passing the same through mixing flues, mixing air with the vapor in said flues, in volume sufficient to support intense combustion, admitting said mixture of vapor and air into a separate burning chamber, and permitting combustion therein.

16. The process of treating zinc bearing material to produce zinc oxide directly therefrom which comprises smelting the ore in a reverberatory furnace, passing the zinc vapor to a settling chamber having a volume greater than the furnace to settle out foreign matter mingled with said vapor and continuously removing portions of the zinc vapor from said settling chamber, passing the same through mixing flues, mixing air with the vapor in said flues in volume sufficient to oxidize the zinc vapor, admitting said mixture of vapor and air in a separate burning chamber, and permitting combustion therein.

17. The process of treating zinc bearing material to produce zinc oxide directly therefrom in a continuous operation, which comprises smelting the ore in a reverberatory furnace under normal smelting conditions, passing the zinc vapor to a settling chamber having a temperature above the distilling point of the zinc and below the temperature of the furnace and having a volume greater than the furnace to settle out foreign matter mingled with said vapor, continuously removing zinc vapor from the settling chamber in a plurality of streams subdividing said streams and mixing air therewith in a volume at least sufficient to oxidize the zinc vapor, admitting said mixture of vapor and air into a separate burning chamber to oxidize the zinc vapor and collecting the zinc oxide.

18. The process of treating zinc bearing material to produce zinc oxide directly therefrom in a continuous operation, which comprises smelting the ore in a reverberatory furnace under normal smelting conditions, passing the zinc vapor and products of combustion to a settling chamber having a volume greater than the furnace to settle out foreign matter, continuously removing zinc vapor and products of combustion from the settling chamber, subdividing said vapor and passing the same through mixing flues, introducing air into said mixing flues in volume sufficient to oxidize the zinc vapor, admitting said mixture into a separate burning chamber to burn the zinc vapor and collecting the zinc oxide.

Signed at Pueblo, in the county of Pueblo, and State of Colorado, this 21st day of October, A. D., 1924.

JOHN F. CREGAN.